United States Patent [19]

Mayr

[11] Patent Number: 4,752,112
[45] Date of Patent: Jun. 21, 1988

[54] RIBBON CONDUCTOR COMPRISING A PLURALITY OF LIGHT WAVEGUIDES AND A METHOD OF MANUFACTURE

[75] Inventor: Ernst Mayr, Starnberg, Fed. Rep. of Germany

[73] Assignee: Siemens Aktiengesellschaft, Berlin and Munich, Fed. Rep. of Germany

[21] Appl. No.: 17,589

[22] Filed: Feb. 24, 1987

[30] Foreign Application Priority Data

Feb. 28, 1986 [DE] Fed. Rep. of Germany ....... 3606617

[51] Int. Cl.$^4$ .................................................. G02B 6/44
[52] U.S. Cl. ................................ 350/96.23; 350/96.10
[58] Field of Search ........................... 350/96.10, 96.23

[56] References Cited

U.S. PATENT DOCUMENTS

| 4,147,407 | 4/1979 | Eichenbaum et al. | 350/96.34 |
| 4,370,023 | 1/1983 | Lange et al. | 350/96.23 |
| 4,641,916 | 2/1987 | Oestreich et al. | 350/96.23 |

FOREIGN PATENT DOCUMENTS 3011009 10/1981 Fed. Rep. of Germany .
2508825 6/1982 Fed. Rep. of Germany .

Primary Examiner—William L. Sikes
Assistant Examiner—Akm E. Ullah
Attorney, Agent, or Firm—Hill, Van Santen, Steadman & Simpson

[57] ABSTRACT

A ribbon conductor has a plurality of light waveguides arranged in side-by-side row and surrounded by a common protective sheath, each of the light waveguides includes an optical fiber having a coating of hard material, a gliding layer on the coating, and a loose protective sheath. The outer common sheath of the ribbon conductor surrounds the row of side-by-side waveguides and contacts the outer two waveguides of the row with a substantially semi-cylindrical contact area while it contacts the inner waveguides of the row in two tangentially arranged contact regions.

8 Claims, 1 Drawing Sheet

RIBBON CONDUCTOR COMPRISING A PLURALITY OF LIGHT WAVEGUIDES AND A METHOD OF MANUFACTURE

BACKGROUND OF THE INVENTION

The present invention is directed to a ribbon conductor or cable having a plurality of light waveguides which are arranged side-by-side in a row in a common outside sheath and are relatively movable to the sheath and to a method for manufacturing the conductor.

U.S. Pat. No. 4,147,407, which was the basis for German OS No. 26 55 996 discloses a ribbon conductor having optical waveguides provided with a coating or sheath which waveguides are arranged lying side-by-side in a row in one plane. In order to form the ribbon conductor, the cladding or sheaths of each of the waveguides are brought into contact with adjacent waveguides of the row and are treated with a solvent so that the material of the sheaths will adhere to one another in the region of their contact to form the ribbon-like structure. This type of arrangement has several disadvantages because the mechanical stresses that occur in further process, for example, during stranding or laying of the conductor, will act directly on the sensitive light waveguide fibers because the overall structure allows no dislocation or movement of the individual light waveguides relative to each other or to the ribbon.

In German AS No. 25 08 825, a stranding element for optical cables having a two-part, roughly box-shaped profile member is provided. The box-shaped member has longitudinally extending chambers which are formed in the interior and which receive respective light waveguide leads. The mobility of the light waveguides relative to one another is, in fact, guaranteed by such arrangement as is a good protection of the overall arrangement against externally acting shear forces. However, a disadvantages of this arrangement is that the two-part, box-shaped profile member is required to serve as a housing for the overall arrangement. This box requires a relatively involved manufacturing process and also yields a structure that is relatively stiff overall and whose further processing can lead to difficulties, particularly in conjunction with stranding processes.

SUMMARY OF THE INVENTION

The object of the present invention is to create a ribbon conductor which comprises the smallest possible dimensions and whose fibers are mobile relative to each other to the greatest degree and whose fibers are protected against mechanical influences.

In accordance with the present invention, this object is achieved in a ribbon conductor having a plurality of light waveguides arranged in a mobile fashion side-by-side in a row in a common outside sheath. The improvements are that each of the light waveguides has a cladding, a glide layer surrounding the cladding, and a loosely positioned protective sheath surrounding the glide layer, the plurality of light waveguides are arranged side-by-side in a row and have a common protective outside sheath directly contacting the outer sheaths of each of the fibers so that the common sheath surrounds the outer two light waveguides of the row with a semi-cylindrical engagement and contacts the inner disposed waveguides only at two regions lying opposite one another.

Since the light waveguide leads, which comprise a protective sheath loosely seated on a gliding layer, are employed in the invention, these leads exhibit a certain inherent mobility and are capable of executing yielding operations to a certain degree given mechanical stresses. The mobility and, above all else, the easy twistability of the ribbon conductor, which is required for certain stranding processes, are additional improved in that the individual light waveguide leads also directly abut one another and are not surrounded on all sides by the common outside sheath and therefore are not retained by this common outside sheath.

It is particularly expedient when the individual light waveguides are arranged mobile relative to one another to the greatest possible degree. It can thereby be advantageous to apply the a common outside sheath so that it surrounds the two outer waveguides of the row of waveguides with a roughly semi-cylindrical engagement and contacts the inner light waveguides, only roughly tangentially on two opposite regions thereof. In this way, the mobility of the light waveguide leads relative to one another and to the outside common sheath surrounding them is guaranteed to a particularly far-reaching degree despite the compact format and the compact overall arrangement.

Another feature of the invention is an addition to these above-mentioned favorable properties is the conductor ribbon of the invention can be manufactured in a particularly simple way.

The invention is also directed to the method for the manufacture of the ribbon conductor which is characterized in that the individual light waveguide leads are taken from supply reels and brought together and arranged in a row next to one another, the light waveguides are moved through a guide device at whose output a stretched cone of material from an extruder is formed and stretched down onto the light waveguides which extend side-by-side so that the light waveguides are surrounded by the extruded outer common sheath to form the ribbon conductor.

Other advantages and features will be readily apparent from the following description, drawings and claims.

DETAILED DESCRIPTION

Figure 3:
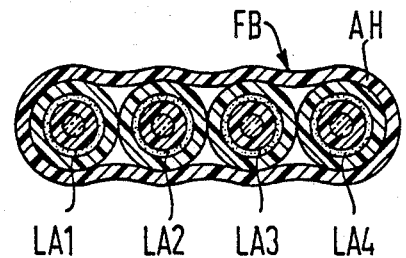
FIG. 3 is a cross sectional view of a structure of a finished ribbon conductor in accordance with the present invention.

The principals of the present invention are particularly useful when incorporated in a ribbon conductor or cable generally indicated at FB in FIG. 3.

Figure 2:
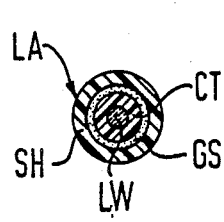
FIG. 2 is a cross section through the structure of a light waveguide which is utilized within the framework of the present invention.

To form the ribbon conductor FB, supply reels SP1-SPn are provided to provide light waveguides LA1-LAn. The light waveguides have a structure, which is shown in FIG. 2 and includes an optical fiber or light waveguide LW which has a coating CT applied thereto. This structure comprises an outside diameter roughly on the order of magnitude and arranged between 100 and 250 m. Subsequently, a relatively thin gliding or lubricating layer GS is applied and has a thickness in the magnitude of 50 m. This gliding layer GS provides a certain mobility within an externally applied protective sheath SH for the light waveguide LA. The hard protective sheath SH, that is loosely applied, is preferably composed of a polyamide or polyimide. The outside diameter of the light waveguide LA is in a range of about 400 through 600 $\mu$m. Details regarding the structure of such a light waveguide are disclosed, for example, in German OS No. 34 00 605, which corresponds to U.S. Ser. No. 684,290.

Figure 1:
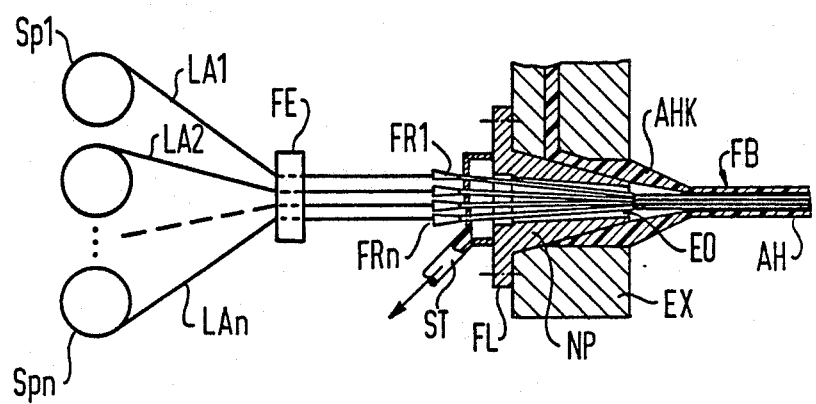
FIG. 1 is a side view with the portions broken away of an apparatus for the manufacture of a ribbon conductor constructed in accordance with the present invention.

In the apparatus illustrated in FIG. 1, the individual light waveguides LA1-LAn proceed through guide element FE which guide element see to it that they proceed lying in order side-by-side in roughly one plane. The guide element FE can be constructed in a simple way, and, for example, in the fashion of a comb. Subsequently, the light waveguide leads LA1-LAn proceed to a guide device which sees to it that they retain this mutual allocation and their position within a plane remains unaltered in a further manufacturing process. In detail, this additional guiding device is composed of guide tubes FR1-FRn which are provided with a conical entry funnel on the input side and comprise an adequately large inside diameter which is larger than the outside diameter of the light waveguide leads and is roughly on the order of magnitude of 600 $\mu$m, given a light waveguide diameter of 500 $\mu$m.

As a result of the thin guide tubes FR1-FRn which react like injection needles, the light waveguides LW1-LWn are brought close together and emerge at the end of the guide tubes FR1-FRn in such a distribution that their protective sheaths SH already nearly abut or engage or respectively are at least in tight proximity to one another. The guide tube FR1-FRn extend through a passage EO in the extruder head of an extruder EX and end roughly in the region in which a stretched cone AHK is pulled from the extruder EX. This stretched cone AHK is placed under tension by a haul-off means, which is positioned on the right hand part of the Fig. and is not illustrated. The cone increasingly diminishes in diameter to such a degree that until the outside sheath AH formed by the cone completely surrounds the light waveguide leads which continue to proceed side-by-side in a row. A structure as shown in FIG. 3 for the four light waveguide leads LA1-LA4 will then occur. The sheathing or outer common sheath AH embraces the two outer waveguides LA1 and LA4 of the row by roughly 180° so that it has a roughly semi-cylindrical contact area therewith. The inner light waveguides LA2 and LA3 exhibit roughly tangential regions of contact with the outer sheath AH only at opposite sides or regions. A certain mobility of the light waveguide leads LA1-LA4 relate to one another as well as within the outside sheath AH is thus guaranteed. An additional mobility and, thus, a gentle treatment of the sensitive optical fibers is established in that each of the light waveguides additionally includes the gliding layer GS in accordance the structure shown in FIG. 2. This gliding layer GS likewise represents a protection for the sensitive fiber of the waveguide LW. Together with the gliding layer GS, the protective sheath SH also has the additional task of prevention an inadmissible thermal stressing of the light waveguide fibers LW when the outside sheath AH is shrunken onto the light waveguide structure as illustrated in FIG. 3.

In the region of its passage EO, the extruder EX comprises a nipple NP and an externally extending flange FL. A suction nozzle ST is attached to this flange FL and provides a vacuum or under-pressure. In this way, the shape of the cone AHK can be ideally matched to the dimensions of the waveguides passing therethrough.

Apart from the round edges, the ribbon conductor FB in accordance with FIG. 3 represents a roughly rectangular structure which is inherently highly flexible, enables an optimum preservation of the individual light waveguides and their fibers and simultaneously assures that the structure constructed in this way can be used with versatility. Even if the outside sheath AH were to shrink somewhat into the gores or gaps between the light waveguide LA1-LA4, the waveguides still remain arranged abutting one another and the possibility for compensating motions relative to one another still exist.

The light waveguides LA1-LAn advantageously comprise outside diameters on the order of magnitude of 500 $\mu$m. The outside sheath AH of the ribbon conductor is preferably composed of a polyester elastomer having a wall thickness between 100 and 200 $\mu$m.

Insofar as the longitudinally water-tight embodiments of the ribbon conductor is desired, a filling compound, for example, can also be supplied via guide tubes FR1-FRn. Thus, the common outside sheath AH will then surround not only the light waveguides LA1--LAn, but also the filling compound which will be in the gores or spaces between the light waveguides and form a water-tight arrangement.

The gliding layer GS should exhibit a pasty, but not drippy, consistency. Thixotropic oils, preferably enriched with a thickening agent, can preferably be provided for this purpose. Such oils are disclosed in European Pat. No. 00 29 198, which is corresponding to U.S. Pat. No. 4,370,023.

Although various minor modifications may be suggested by those versed in the art, it should be understood that I wish to embody within the scope of the patent granted hereon all such modifications as reasonably and properly come within the scope of my contribution to the art.

I claim:

1. In a ribbon conductor having a plurality of light waveguides in mobile fashion side-by-side in a row and in a common outside sheath, the improvements comprising each of the light waveguides having an optical fiber with a coating, a gliding layer surrounding the coating and a loosely positioned protective sheath being arranged on the gliding layer, wherein a plurality of said light waveguides being arranged in side-by-side relationship having their respective protective sheaths directly abutting one another to form a row of waveguides, and the common outside sheath being applied to surround the row of waveguides and contacting the outer two waveguides of the row of waveguides with a roughly semi-cylindrical engagement and contacting the inner waveguides of the row only at two regions lying opposite one another.

2. In a ribbon conductor according to claim 1, wherein the protective sheath for each of the light waveguides is composed of a hard plastic material selected from a group consisting of polyamide and polyimide.

3. In a ribbon conductor according to claim 1, wherein the light waveguides are arranged to be mobile relative to one another.

4. In a ribbon conductor according to claim 1, wherein the inner light waveguides in the row contact the outer common sheath essentially only roughly tangentially.

5. In a ribbon conductor according to claim 1, wherein the outside diameter of each of the light waveguides is selected to be in the range of between 400 and 600 μm.

6. In a ribbon conductor according to claim 1, wherein the common outside sheath has a wall thickness in a range of 100 to 200 μm.

7. In a ribbon conductor according to claim 1, wherein the light waveguide arranged in the row within the common outside sheath only slightly contact each other.

8. A method for manufacturing a ribbon conductor having a plurality of light waveguides with each waveguide having an optical fiber with a hard coating, a gliding layer surrounding the hard coating and a loosely applied sheath surrounding the gliding layer, said waveguides being arranged side-by-side to form a row of waveguides within a common outer sheath, said method comprising removing the plurality of individual light waveguides from individual supply reels, moving the plurality of waveguides into a row having a side-by-side order, moving the waveguides through a guide device whose output end is positioned within a cone of extruded material from an annular extrusion nozzle, pulling the cone of annularly extruded material down onto the row of light waveguides which are arranged in side-by-side order to surround the row to form a ribbon conductor having mobile waveguides therein.

* * * * *